June 15, 1965    N. N. FENDER    3,188,883
MECHANISM CONTROL
Filed Dec. 19, 1962    2 Sheets-Sheet 1
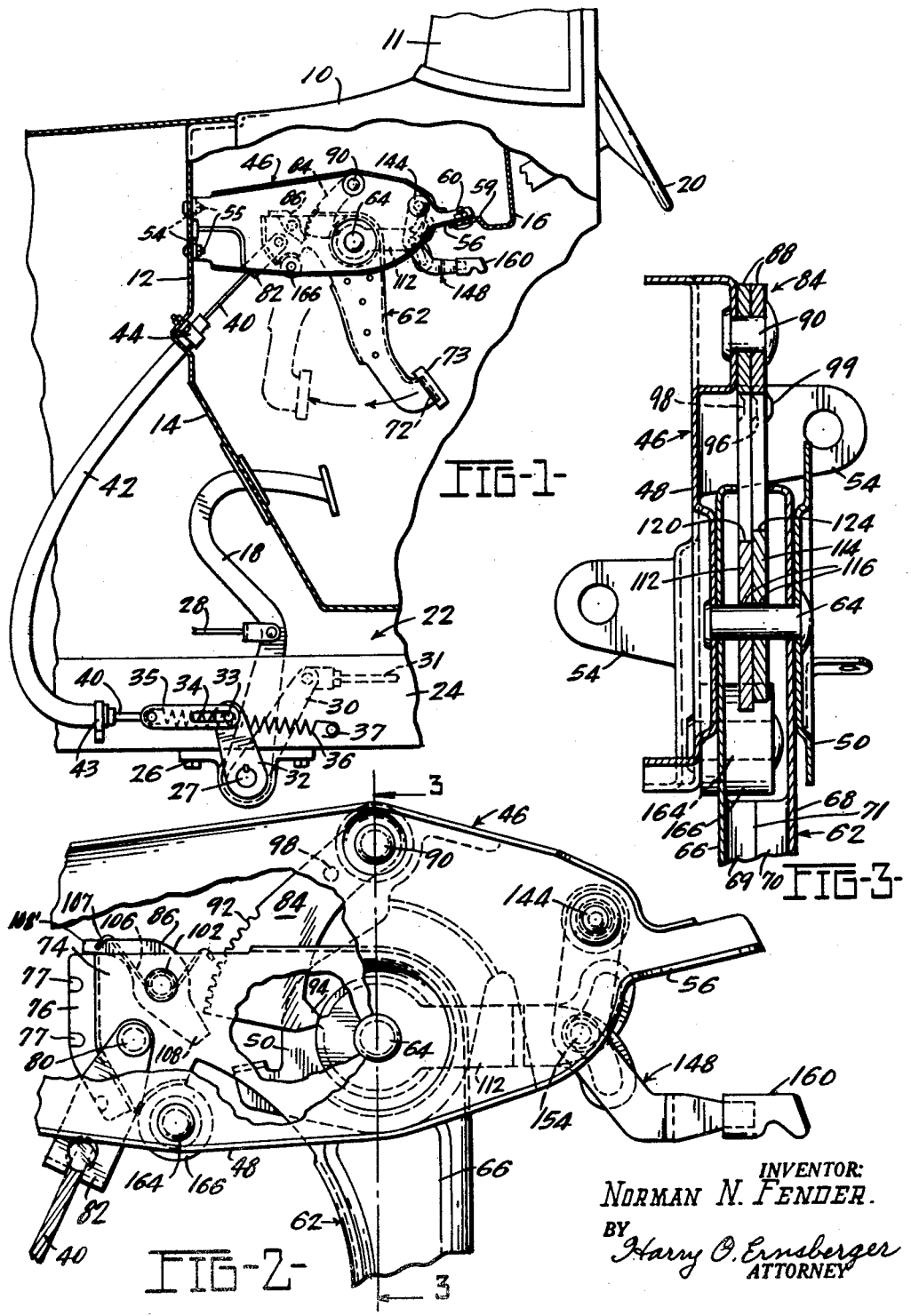
INVENTOR:
NORMAN N. FENDER.
BY
Harry O. Ernsberger
ATTORNEY

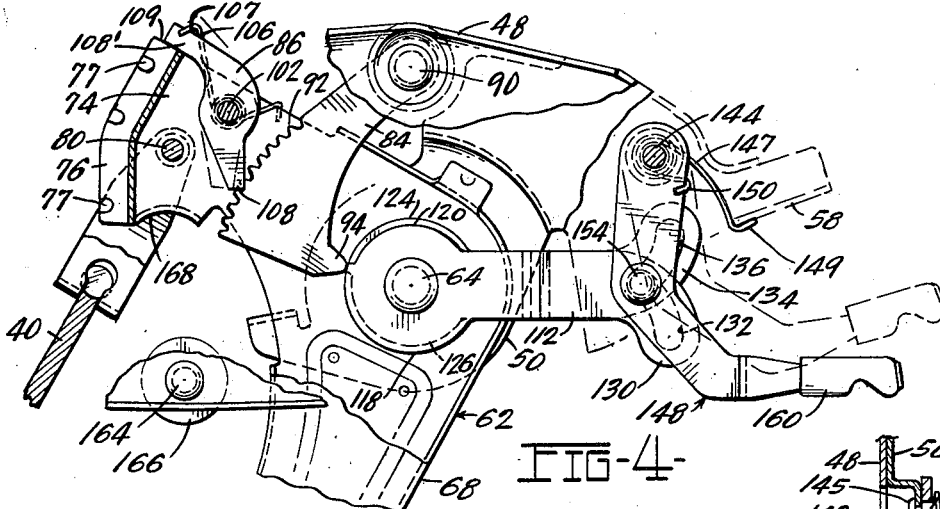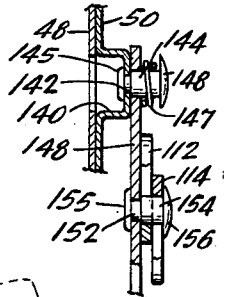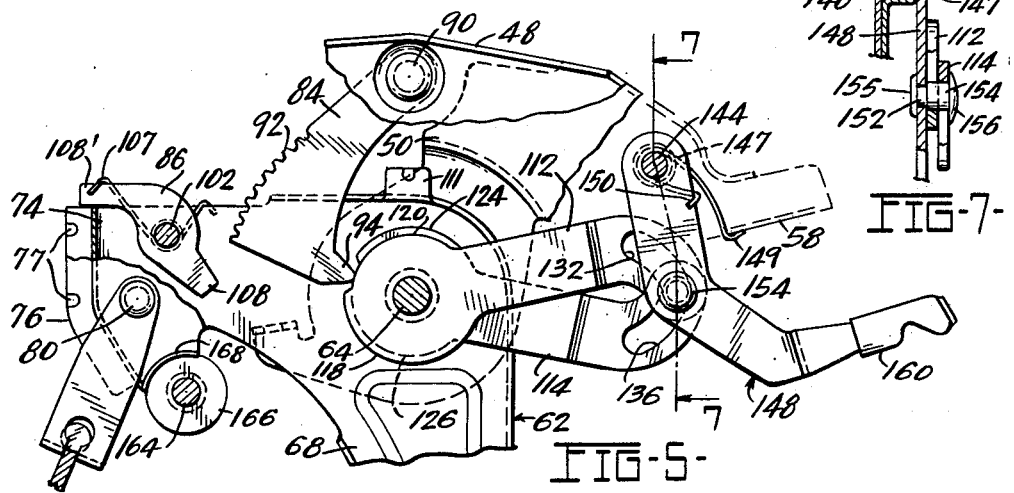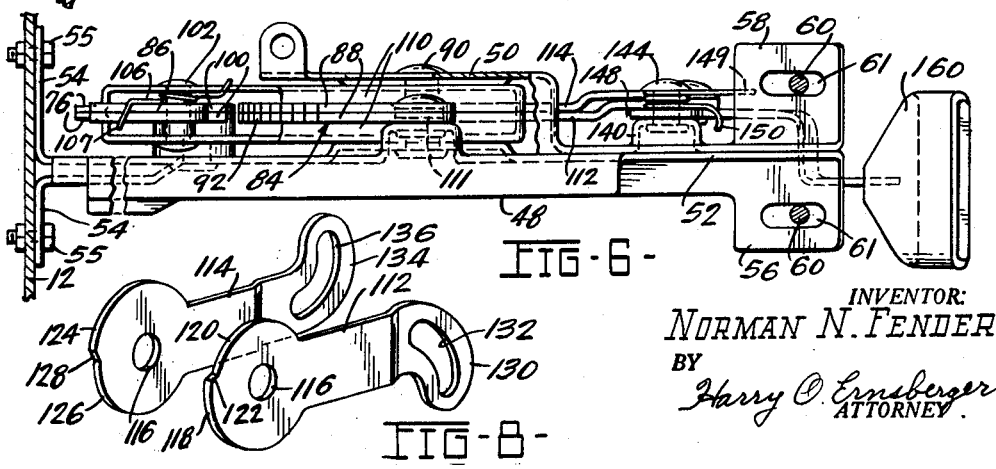

United States Patent Office 3,188,883
Patented June 15, 1965

3,188,883
MECHANISM CONTROL
Norman N. Fender, Erie, Mich., assignor to Universal American Corporation, New York, N.Y., a corporation of Delaware
Filed Dec. 19, 1962, Ser. No. 245,782
13 Claims. (Cl. 74—534)

This invention relates to mechanism control and more particularly to means or mechanism for actuating or controlling the parking or emergency brakes of a vehicle.

Heretofore various types of both hand-operated and foot-operated devices or mechanisms have been developed and utilized for actuating and controlling the parking brakes of an automotive vehicle. While many types of hand-operated devices have been utilized extensively for setting the parking or emergency brakes of a vehicle, the trend in automotive vehicle development toward a lower vehicle body silhouette, the increased use of the space between the dashboard or firewall and the instrument panel, the increase in brake pressures requiring greater force to actuate the vehicle brake mechanism have been instrumental in furthering the use of foot actuated means or pedal levers for controlling the parking brakes of a vehicle.

It is essential to employ positive acting means for holding the emergency or parking brakes in brake-setting positions and, hence, various types of foot-operated lever mechanisms have embodied a pawl means arranged for cooperation with a toothed sector or rack for the purpose. In such devices it is desirable that the arrangement, for holding the pawl and ratchet member in brake-setting position, be provided with means whereby the pawl and rack member are disengaged in order to release the brakes and avoid liability for these components to be prematurely reengaged before the brake actuating lever has been returned to its brake release position. Otherwise, if there is premature reengagement of the pawl and ratchet mechanism, the teeth of the rack may be damaged and, furthermore, the brake may not be fully returned to a release position.

Mechanisms of this character have been developed wherein the ratchet sector or rack is pivotally supported so that it may be swung out of the path of a retaining pawl, and the patent to Hinsey No. 2,978,926 is directed to an arrangement of this character wherein a manually operated drawbar normally holds the ratchet sector in operative position for engagement by the pawl but which is movable away from the pawl to release the brakes. With the increase in braking forces, the pressure of the pawl acting against the teeth of the sector is substantial and hence the means normally holding the ratchet sector in pawl-engaging position is subjected to increased forces which must be overcome in releasing the mechanism.

Furthermore, in an arrangement of this character, substantial movement of a release means must be had in order to effectively release the ratchet member from engagement with the pawl.

The present invention embraces a foot-operated lever arrangement adapted to be connected with the vehicle parking or emergency brakes wherein the lever arrangement embodies a pawl means and toothed sector means for retaining the lever arrangement in brake-setting positions and wherein one of said means is held in a position for cooperation with the other of said means by a plurality of abutments arrangements to be moved by the vehicle operator to effect a disengagement of the pawl and sector means.

Another object of the invention is the provision of a foot-operated lever arrangement for actuating and controlling parking or emergency brakes of a vehicle embodying a pawl and toothed sector means for retaining the lever arrangement in brake-setting positions wherein the toothed sector is articulately supported and adapted to be held in a position to be engaged by the pawl through the medium of multiple arms fashioned with cam surfaces for engagement with the sector means wherein the arms are arranged to be moved simultaneously to positions to effect a release of the sector means from engagement with the pawl to release the brake mechanism.

Another object of the invention is the provision of a foot-operated lever arrangement of this character adapted to be connected with the vehicle parking brake mechanism and embodying a pawl and toothed sector means normally held in a position for interengagement for holding the lever arrangement in brake-setting positions and wherein one of said means is releasable to a position for releasing the brake mechanism by multiple cams which are reliable in their operation and which minimize the liability of damage to the teeth of the sector or the pawl.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an elevational view of a portion of an operator's compartment of a vehicle, certain parts being broken away, illustrating a form of mechanism control of my invention installed in a vehicle;

FIGURE 2 is an enlarged side elevational view of the upper portion of the brake actuating and control mechanism of the invention;

FIGURE 3 is an enlarged vertical sectional view taken substantially on the line 3—3 of FIGURE 2;

FIGURE 4 is a view similar to FIGURE 2 illustrating the actuating and control mechanism of the invention in brake-setting position;

FIGURE 5 is a view similar to FIGURE 4 illustrating the actuating and control mechanism in a brake release position;

FIGURE 6 is a top plan view of the arrangement shown in FIGURE 5;

FIGURE 7 is a detail sectional view taken substantially on the line 7—7 of FIGURE 5, and FIGURE 8 is an isometric view of the cam elements forming components of the invention.

While the form of the mechanism control of the invention illustrated is particularly adapted for installation in antomotive vehicles and utilized for actuating or controlling the emergency or parking brakes of a vehicle, it is to be understood that the arrangement of the invention may be utilized for controlling or actuating other forms of mechanism wherever the same may be found to have utility.

Referring to the drawings in detail, FIGURE 1 illustrates the installation of a form of the invention in the vehicle operator's compartment of a vehicle. The portion of the vehicle illustrated is inclusive of a cowl section 10, a windshield 11, a dashboard or firewall 12, a toeboard 14, an instrument panel 16, a service brake actuating pedal 18 and a steering wheel 20. The chassis portion of the vehicle shown in FIGURE 1 includes a frame construction 22 comprising a pair of parallel side frame members 24, one of which is shown in FIGURE 1, which are joined by transverse cross members (not shown).

Secured to the frame members 24 are brackets 26 journally supporting a cross shaft 27. The service brake pedal 18 may be journally supported upon the shaft 27 and the pedal connected by means of a rod 28 with the master cylinder construction of a conventional hydraulic service brake mechanism. Secured upon the shaft 27 is an upwardly extending arm 30 arranged to be connected by a rod 31 or other suitable means with the parking brakes (not shown) of the vehicle associated with a pair of road wheels, the parking brakes being of conventional construction.

Also secured on the shaft 27 is an arm 32 equipped at its distal end with a pin 33 extending into a slot 34 formed in a member or link 35. A contractile spring 36 is connected at one end with the bar 35, the other end of the spring being connected with an anchor member 37 secured to a side frame member 24. The spring 36, in conjunction with the conventional brake return springs (not shown), function to normally bias the link 35 in a right-hand direction, as viewed in FIGURE 1, toward brake release position.

Connected to the link 35 is a flexible cable 40 which is enclosed or encased within a tubular sheath 42, the lower end of the sheath being secured to a frame member 24 by a clamp 43. The upper end of the sheath is secured to the firewall 12 by means of a clamp 44.

Mounted within the operator's compartment is a support or bracket construction 46 formed of sheet metal components including a main plate or bracket 48 and a supplemental bracket 50. The brackets or plates 48 and 50 have contiguous portions which are joined at a region or plane 52 by spot welding or other securing means.

One end of the plate 48 of the bracket construction 46 is provided with oppositely extending ear portions 54 secured to the firewall 12 by means of bolts 55. The other end of the bracket 48 and the bracket 50 are respectively provided with flanges or projections 56 and 58 secured to a flange portion 59 of the instrument panel 16 by means of bolts 60 extending through slots 61 formed in the projections 56 and 58. The bracket construction 46 provides a support for the foot-operated brake actuating lever construction 62 and a means for retaining the parking brakes in adjusted or brake-setting positions and a release means for the retaining means.

The main lever construction 62 is pivotally mounted or fulcrumed on the support 46 by means of a pin or shaft 64. The lever construction 62 is preferably formed of sheet metal of two similarly shaped mating sections 66 and 68, the lower portions of which are of channel-shaped configuration in cross-section, the inwardly extending flange portions 69 and 70 of the sections respectively engaging at a juncture region 71, shown in FIGURE 3, and the flanges butt welded together. The lower end of the lever construction 62 is provided with a metal foot pad portion 72 preferably faced or covered with a pad 73 of rubber or other suitable material.

The lever construction 62 is fashioned with a forwardly projecting arm or portion 74, the extremities of which are fashioned with contiguous tab or pad portions 76 spot welded together as indicated at 77. The portions of the lever providing the extension 74 are formed with openings to accommodate a rivet or pin 80 for connecting a clevis 82 with the lever construction 62, the clevis being secured to the upper end of the brake cable 40. As viewed in FIGURE 1, counterclockwise movement of the foot-operated lever 62 about its fulcrum 64 exerts an upward pull upon the cable 40 to set the parking or emergency brakes of the vehicle.

The means for retaining the brake-setting lever in adjusted or brake-setting positions includes a toothed rack means or ratchet sector 84 and a cooperating pawl or pawl construction 86. The toothed sector construction 84 in the embodiment illustrated comprises a pair of identically shaped members 88. The members 88 are provided with aligned openings accommodating a pin or rivet 90, the rivet or pin passing through an opening in the support member 48 whereby the ratchet construction 84 is pivotally or articulately mounted on the support 46. Each of the plates 88 is fashioned with a series of matching ratchet teeth 92 and with a projection 94.

In the operation of the sector construction, the plates or components 88 thereof move as a unit. As shown in FIGURE 3 each of the plates may be fashioned with a projection 96 formed by impressing a socket 98 in the plate whereby the adjacent projection on one plate nests in a socket in the adjacent plate so that the plates move together.

While the plates 88 of the ratchet construction would be operable without the interconnecting projections 98, it is preferable that the plates 88 be interlocked in the manner illustrated in FIGURE 3 or otherwise fashioned so as to move together.

The pawl construction 86 is preferably formed of a pair of plates 100 of identical configuration, the pawl plates being pivotally mounted upon a rivet or stub shaft 102 carried by the portion 74 of the lever 62, the pawl construction being disposed between the side walls of the lever construction as shown in FIGURE 6, and arranged for engagement with the teeth 92 of the ratchet member or construction 84. The pawl construction 86 is biased by a spring 106 to engage the pawl tooth 103 with the ratchet teeth 92.

The pawl construction 86 is provided with a flange or projecting portion 108 which is adapted for engagement with an upper edge region 109 of the projection portion 74 of the lever 62 in order to limit pivotal movement of the pawl 86 in a counterclockwise direction for a purpose to be hereinafter explained. An end region 107 of spring 106 engages the projecting portion 108 of the pawl and the other end of the spring is hooked over the edge of one of the side walls of the lever. While the ratchet construction 84 and the pawl construction 86 are each formed of two matching plates, each of these constructions may be fashioned as a single element equal to substantially twice the thickness of one of their components.

However, it has been found preferable to form the ratchet construction and the pawl construction of two mating sections or blanks as the thinner metal may be more readily blanked or sheared to desired configuration whereby to form more accurately shaped teeth. As shown particularly in FIGURE 6, the side walls of the sections of the lever at a region above the fulcrum are fashioned with inwardly extending flanges 110 having their edge regions spaced to accommodate the ratchet construction 84 and to thereby maintain the ratchet construction aligned with the pawl construction 86. That mating lever sections adjacent the flanges 110 are provided with outwardly projecting ears or tabs 111, shown in FIGURES 5 and 6 which are spot welded together to lend rigidity to the lever construction.

The arrangement of the invention provides for relative movement of the sector 84 into or out of the path of movement of the pawl 86 to hold the lever in brake-setting position and for releasing the lever 62 for movement to brake release position. This arrangement includes dual elements, arms or members 112 and 114 fashioned with cam surfaces or abutment means for controlling the position of the ratchet member or sector 84.

As particularly illustrated in FIGURE 8, each of the arms 112 and 114 is provided with an opening 116 to accommodate the shaft or fulcrum 64 of the lever, the shaft also supporting the arms 112 and 114 for relative pivotal or journal movement about the axis of the shaft or pin 64. The arms 112 and 114 are arranged in contiguous relation and are aligned with the two components of the ratchet sector or member 84.

The arm 112 has a generally circular end region with a curved surface 118 and a second curved surface 120, the latter being of lesser radius than the radius of the curved surface 118, both surfaces being generated about the axis of the circular opening 116. A transition surface 122 joins the two curved surfaces 118 and 120, these surfaces forming cam means.

The arm 114 likewise has a generally circular end region including a curved surface 124, a second curved surface 126 of lesser radius, and a transition surface 128 joining the curved surfaces 124 and 126, the latter surfaces being generated about the axis of the circular opening 116. It should be noted that the curved surface or abutment 118 of arm 112 is at the lower portion of the arm while the corresponding curved surface or abutment 124 of the same radius as the surface 118 is at the upper portion of the arm 114. The arm 112, at its opposite end, is configurated with a curved portion 130 fashioned with a curved slot 132, and the end of the arm 114 configurated with an oppositely curved portion 134 provided with a curved slot 136 of curvature opposite the curvature of the slot 132.

As particularly shown in FIGURES 6 and 7, the bracket component 50 is fashioned with a raised or boss-like portion 140 having an opening to accommodate a tenon portion 142 of a stub shaft or rivet 144, a portion 145 of the rivet being swaged as shown in FIGURE 7 to secure the rivet to the raised portion 140. The rivet 140 provides a pivotal support for a manipulating means or release means for controlling the relative positions of arms 112 and 114 and hence the relative position of the ratchet member 84.

The control or manipulating means in the embodiment illustrated is in the form of a generally L-shaped lever 148, a stub shaft 144 extending through an opening in the lever and providing a pivotal support or fulcrum therefor. A coil spring 147 is disposed between a head 148 of the rivet or stub shaft 144 and the release means or supplemental lever 148 as shown in FIGURE 7. One end 149 of the spring 147 engages the pad portion 58 of the support bracket, as shown in FIGURE 6, the opposite end 150 of the spring being hooked over the edge of the manipulating lever 148.

The spring 147 is tensioned to bias the supplemental lever 148 for movement in a clockwise direction, as viewed in FIGURES 4 and 5. An intermediate region of the lever 148 is provided with an opening receiving a tenon portion 152 of a rivet or stub shaft 154, the tenon terminating in a swaged head portion 155 fixedly securing the rivet 154 to the release lever 148.

The body portion of the rivet 154 extends through both curved slots 132 and 136 formed in the arms 112 and 114, the head 156 of the rivet 154 securing the curved regions 130 and 134 of the arms in contiguous relation but with sufficient clearance to permit relative slidable movement of the arms under the influence of swinging movements of the release lever 148. The lever 148 is provided with a handle or grip portion 160 which may be fashioned of molded plastic or the like.

Means is provided for cushioning the impact of the lever construction 62 upon its return to brake release position. The bracket construction 46 is equipped with a stub shaft 164 which supports a cylindrically-shaped cushion member 166 of semi-hard rubber or other yieldable nonmetallic material. As particularly shown in FIGURE 5, the metal sections forming the lever construction 62 are fashioned with inwardly extending flanges 168 of a curvature to fit the exterior curvature of the cushion member 166. Upon return movement of the lever 62 to brake release position, the lever flanges 168 engage the cushion member 166 and thereby absorb the impact or shock.

With particular reference to FIGURES 2 and 4 it will be noted that the manipulating or release member 148, under the influence of the spring 147, is normally biased to its maximum position of movement in a clockwise direction. In moving to this position, the pin 154, carried by the manipulating lever 148, traverses the curved slots 132 and 136 in the arms 112 and 114, moving the arms to positions wherein the raised curved portions or abutments 118 and 124 are in overlapping relation, the overlapping regions supporting the ratchet sector 84 in its uppermost or operative position by engagement of the projection 94 of the ratchet member with the overlapping portions.

The ratchet member 84 is thereby supported in its elevated position so that the teeth 92 thereof are in the path of movement of the pawl 86 during movement of the lever 62 toward brake-setting position.

The operation of the arrangement of the invention is as follows: The brake lever construction 62 is shown in brake release position in FIGURES 1, 2 and 5. In this position, the arms 112 and 114 are held by the manipulating lever 148 in a position whereby the cam surfaces or abutments 118 and 124 engage the projection 94 on the sector member 84 holding the sector in its pawl engaging or operative position. With the lever construction 62 in release position, the pawl member 86 is out of engagement with the teeth 92 of the sector member.

When the operator desires to set the emergency or parking brakes of the vehicle, foot pressure is applied upon the foot pad 73 swinging the main foot-operated lever 62 about its fulcrum 64 in a clockwise direction, as viewed in FIGURES 1 and 2. During this movement of the lever 62 to brake-setting position, the ratchet sector 84 is held in its elevated or operative position and the pawl 86 rides over the teeth 92 of the sector member 84, the pawl being biased toward engagement with the teeth under the influence of the spring 106.

Movement of the foot-operated lever 62 toward brake-setting position exerts upward pull upon the brake cable 40 to set the emergency or parking brakes. When the brakes have been set, the foot-operated main lever 62 is held in brake-setting position by engagement of the tooth 108 of the pawl 86 engaging one of the ratchet teeth 92 in the ratchet member 84. As the ratchet member 84 is supported in its operative or brake retaining position by the abutments 118 and 124, the interengagement of pawl 86 and ratchet member 84 holds the brakes in set position.

When the vehicle operator desires to release the emergency or parking brakes, the grip member 160, carried by the release member 148, is grasped and lifted upwardly to swing the release member about its pivotal support 144. The swinging movement of the manipulating or release means 148, in a counterclockwise direction as viewed in FIGURES 1, 2, 4 and 5 cause the pin 154 to traverse the curved slots 132 and 136 in the cam elements or arms 112 and 114. This action causes the arm 112 to swing upwardly or in a counterclockwise direction about the pivot shaft 64, and the arm 114 to swing downwardly or in a clockwise direction about the pivot shaft 64 until the arms are in the positions illustrated in FIGURE 5.

During the opposite swinging or pivotal movements of the arms 112 and 114, the raised surfaces or curved cam surfaces 118 and 124 move away from the projection 94, permitting the projection 94 to ride on the transition surfaces 122 and 128 whereby the projection engages the curved cam surfaces 120 and 126 of lesser radii whereby the projection 94 rests upon these surfaces when the arms 112 and 114 are in release positions shown in FIGURE 5.

This action permits the ratchet or sector member 84 to swing downwardly by gravity in a clockwise direction, as viewed in FIGURE 5, and out of the path of the pawl tooth 108 of the pawl 86.

The movement of the pawl 86 in a counterclockwise direction, as viewed in FIGURE 5, is limited by engagement of the projection 108 of the pawl with the upper edge region 109 of the lever construction 62 so that the sector teeth 92 are free of engagement with the pawl 86. Under the tension of the conventional brake springs exerting a downward pull on the brake cable 40, the lever construction 62 is returned to brake release position, shown in FIGURES 1, 2 and 5.

The operator releases the grip 160 on the release member or lever 148 which, under the influence of the spring 147, is swung in a clockwise direction as viewed in FIGURES 4 and 5, causing the pin 154 to traverse the slots 132 and 136 and thereby return the arms 112 and 114 to the relative positions illustrated in FIGURES 1, 2 and 4.

During this movement of the arms, the transition surfaces 122 and 128 approach each other and overlap one another, moving the projection 94 and the sector 84 upwardly whereby the abutment surfaces 118 and 124 engage and support the sector 84 in a position to be engaged by the pawl tooth 108 during subsequent movement of the foot-operated main lever 62 toward brake-setting position. The impact of return movement of the lever 62 to its initial or brake release position is absorbed by engagement of the lever flanges 168 with the cushion member 166.

From the foregoing it will be seen that the sector 84 is positively held in a supported or pawl engaging position by the overlapping abutment surfaces 118 and 124, but is effectively released by movements of the abutment surfaces in opposite directions under the influence of movement of the manipulating or release member 148 toward brake release position. Through this arrangement of supporting the projection 194 of the sector member by overlapping cam surfaces, there are no pressures or forces transmitted through the sector member tending to rotate the arms 112 and 114 so that the sector is positively held in pawl engaging position and is easily released because the abutments are rotatably supported and the force necessary to move the arms 112 and 114 is greatly reduced because of the distance of the slots 132 and 136 from the supporting shaft 64 and the mechanical advantage of the release lever 148.

It is apparent that, within the scope of the invention, modifications and different arrangements may be made other than as herein disclosed, and the present disclosure is illustrative merely, the invention comprehending all variations thereof.

I claim:

1. Mechanism control of the character disclosed, in combination, a support, a main foot-operated lever fulcrumed on the support, a member formed with ratchet teeth, a pawl member, one of said members being articulately mounted on the support and the other articulately mounted on the lever, a pair of arms journally mounted on the support for rotative movement relative to each other and having abutment surfaces arranged to engage and support one of said members in position to be engaged by the other of said members, and means engaging said arms arranged to effect rotative movement of said arms in opposite directions and relative to said members to move the abutment surfaces away from member-supporting position to effect disengagement of said members.

2. Mechanism control of the character disclosed, in combination, a support, a main foot-operated lever fulcrumed on the support, a member formed with ratchet teeth, a pawl member, said ratchet member being articulately mounted on the support, said pawl member being articulately mounted on the lever, a pair of cam elements journally mounted on the support rotatable in opposite directions to a position to engage and support said ratchet member in a position to be engaged by the pawl member, and actuating means connected with said cam elements for rotating the cam elements in opposite directions and relative to said members to a position to effect disengagement of said ratchet member from the pawl member.

3. Mechanism control of the character disclosed, in combination, a support, a foot-operated lever fulcrumed on the support connected with and adapted to actuate the parking brakes of a vehicle, a member formed with ratchet teeth, a pawl member, one of said members being articulately mounted on the support and the other articulately mounted on the lever, said pawl and ratchet members being engageable for retaining the parking brakes in set position, a pair of elements journally mounted on the support for rotation in opposite directions relative to each other and having cam surfaces adapted to engage and position one of said members for interengagement with the other of said members, and means connected with said elements operable for rotating said elements in opposite directions to a position to effect disengagement of said members to release the parking brakes.

4. Mechanism control of the character disclosed, in combination, a support, a foot-operated lever fulcrumed on the support adapted to actuate the parking brakes of a vehicle, a ratchet member formed with ratchet teeth, a pawl member, said ratchet member being articulately mounted on the support, said pawl member being pivotally mounted on the lever, said pawl and ratchet members being engageable for retaining the parking brakes in set position, a pair of arms journaled on the support for rotation relative to each other, said arms having cam surfaces to engage and position said ratchet member for interengagement with the pawl member, and actuating means engaging said arms for concomitantly moving said arms to a position to effect disengagement of said ratchet member from the pawl member to release the parking brakes.

5. Mechanism control of the character disclosed, in combination, a support, a lever pivotally mounted on the support adapted to actuate the parking brakes of a vehicle, a ratchet member formed with ratchet teeth, a pawl member, one of said members being articulately mounted on the support and the other articulately mounted on the lever, said pawl and ratchet members being engageable for retaining the parking brakes in set position, an arm journaled on the support having an abutment surface adapted to engage and position one of said members for engagement with the other of said members, an actuating element for said arm pivotally mounted on the support on an axis spaced from the axis of the arm, and pin and slot means connecting said arm and said actuating element whereby pivotal movement of said actuating element in one direction moves the abutment to a position to effect disengagement of said members.

6. Mechanism control of the character disclosed, in combination, a support, a foot-operated lever fulcrumed on the support and adapted to be connected with the parking brakes of a vehicle for actuating the brakes, a ratchet member formed with ratchet teeth, a pawl member, one of said members being articulately mounted on the support and the other articulately mounted on the lever, said pawl and ratchet members being engageable for retaining the parking brakes in set position, an arm journaled on the support having a cam surface adapted in one position to support one of said members for engagement with the other of said members, an actuating element pivotally mounted on the support on an axis spaced from the axis of said arm, pin and slot means connecting said arm and said element whereby pivotal movement of said actuating element rotates the arm to a position to effect disengagement of said members, and resilient means biasing the arm to a position to effect interengagement of said members.

7. Mechanism control of the character disclosed, in combination, a support, a main foot-operated lever fulcrumed on the support, a member formed with ratchet teeth movably mounted upon the support, a pawl pivotally mounted on the main lever, a pair of arms journally mounted on the support for rotation relative to each other about a common axis, abutment means on said arms adapted when the arms are in one position of relative rotation to support the ratchet member in a position to engaged by the pawl, said arms being rotatable in opposite directions to a position whereby the abutment means are disengaged from the ratchet member to permit movement thereof out of engaging relation with the pawl.

8. Mechanism control of the character disclosed, in combination, a support, a main foot-operated lever fulcrumed on the support, a member formed with ratchet teeth movably mounted upon the support, a pawl pivotally mounted on the main lever, resilient means normally biasing the pawl into engagement with the teeth of the member, a pair of arms journally mounted on the support for rotation relative to each other about a common axis, abutment means on said arms adapted when the arms are rotated to one position to support the ratchet member in a position to be engaged by the pawl, said arms being rotatable relative to each other to a position whereby the abutment means are disengaged from the ratchet member to permit movement thereof out of engagement with the pawl, each of said arms being formed with a curved surface, and a movable actuating member having means engaged with the curved surfaces for effecting rotation of the arms.

9. Mechanism control of the character disclosed, in combination, a support, a main foot-operated lever fulcrumed on the support, a member formed with ratchet teeth movably mounted upon the support, a pawl pivotally mounted on the main lever, resilient means normally biasing the pawl into engagement with the teeth of the member, a pair of arms, journal means carried by the support upon which said arms are mounted for rotation relative to each other, cam surfaces formed on said arms arranged to support the ratchet member in a position to be engaged by the pawl, said arms being rotatable to a position whereby the cam surfaces permit disenagagement of the ratchet member from the pawl, each of said arms being formed with a slot, and a manipulating member having means engaged in each slot for rotating said arms.

10. Mechanism control of the character disclosed, in combination, a support, a main foot-operated lever, means carried by the support providing a fulcrum for said main lever, a member formed with ratchet teeth movably mounted upon the support, a pawl pivotally mounted on the main lever, resilient means normally biasing the pawl into engagement with the teeth of the member, a pair of arms journally mounted upon the fulcrum means for rotation relative to each other, cam surfaces formed on said arms arranged to support the ratchet member in a position to be engaged by the pawl, said arms being rotatable in opposite directions to a position whereby the cam surfaces permit disengagement of the ratchet member from the pawl, each of said arms being formed with a slot, a manipulating lever having means engaged in each slot for actuating said arms, and resilient means biasing said arms to the ratchet member supporting position.

11. Mechanism for controlling the parking brakes of a vehicle including, in combination, a support, a main foot-operated lever, a shaft carried by the support forming a fulcrum for the level, a member formed with ratchet teeth pivotally mounted upon the support, a pawl pivotally mounted on the main lever, a pair of arms journally mounted on the shaft forming the fulcrum for the foot-operated lever, each of said arms being formed with an abutment, said arms being rotatable in opposite directions relative to each other to a position whereby the abutments support the ratchet member in a position to be engaged by the pawl and to a position to effect disengagement of the ratchet member with the pawl, each of said arms being formed with a curved slot, and an actuating member articulately mounted on the support and having a pin engaged in the slot in each arm for effecting relative rotation of the arms.

12. Mechanism for controlling the parking brakes of a vehicle including, in combination, a support, a main foot-operated lever, a shaft carried by the support forming a fulcrum for the lever, a member formed with ratchet teeth pivotally mounted upon the support, a pawl pivotally mounted on the main lever, resilient means normally biasing the pawl into a position for engagement with the teeth of the ratchet member, a pair of arms journally mounted on the shaft forming the fulcrum for the foot-operated lever, each of said arms being formed with curved surfaces of different radii generated about the journal axis thereof, the curved surfaces on each arm being joined by a transition surface, said arms being rotatable in opposite directions relative to each other to a position whereby the curved surfaces of the greater radii support the ratchet member in a position to be engaged by the pawl and to a position whereby the ratchet member engages the curved surfaces of lesser radii and out of the path of movement of the pawl, and actuating member operatively engaged to said arms for effecting relative rotation of the arms in opposite directions, and resilient means normally biasing said arms to a position supporting the ratchet member in the path of movement of the pawl.

13. Mechanism for controlling the parking brakes of a vehicle including, in combination, a support, a main foot-operated lever, a shaft carried by the support forming a fulcrum for the lever, a member formed with ratchet teeth pivotally mounted upon the support, a pawl pivotally mounted on the main lever, resilient means normally biasing the pawl into a position for engagement with the teeth of the ratchet member, a pair of arms journally mounted on the shaft forming the fulcrum for the foot-operated lever, each of said arms being formed with curved surfaces of different radii generated about the journal axis thereof, the curved surfaces on each arm being joined by a transition surface, said arms being rotatable relative to each other whereby the curved surfaces of the greater radii support the ratchet member in a position to be engaged by the pawl and to a position whereby the ratchet member engages the curved surfaces of lesser radii and out of the path of movement of the pawl, each of said arms being formed with a curved slot, an actuating member mounted on the support and having a pin engaged in the curved slot in each of the arms for effecting relative movement of the arms, and resilient means normally biasing said arms to a position supporting the ratchet member in the path of movement of the pawl.

References Cited by the Examiner
UNITED STATES PATENTS 2,908,185   10/59   Koskela _____ 74—534

BROUGHTON G. DURHAM, *Primary Examiner.*